United States Patent [19]

Modic

[11] 4,189,545
[45] Feb. 19, 1980

[54] SILICONE FOAM COMPOSITION WHICH HAS BURN RESISTANT PROPERTIES

[75] Inventor: Frank J. Modic, Scotia, N.Y.

[73] Assignee: General Electric Company, Waterford, N.Y.

[21] Appl. No.: 886,186

[22] Filed: Mar. 13, 1978

[51] Int. Cl.$^2$ .............................................. C08J 9/12
[52] U.S. Cl. .................................. 521/131; 521/154; 528/12; 528/15; 528/25; 528/31; 528/32
[58] Field of Search ................... 260/46.5 UA, 46–56, 260/825, 2.5 S

[56] References Cited

U.S. PATENT DOCUMENTS

| | | | |
|---|---|---|---|
| 3,425,967 | 2/1969 | Modic | 260/2.5 S |
| 3,677,981 | 7/1972 | Wada et al. | 260/2.5 S |
| 3,697,473 | 10/1972 | Polmonteer et al. | 260/46.5 UA |
| 3,700,714 | 10/1972 | Hamilton et al. | 260/46.5 UA |
| 3,923,705 | 12/1975 | Smith | 260/2.5 S |
| 3,950,300 | 4/1976 | Hittmair et al. | 260/46.5 UA |
| 3,974,122 | 10/1976 | Sato et al. | 260/46.5 UA |
| 3,996,195 | 12/1976 | Sato et al. | 260/46.5 UA |
| 4,035,453 | 7/1977 | Hittmair et al. | 260/46.5 UA |
| 4,043,977 | 8/1977 | de Montigny et al. | 260/46.5 UA |
| 4,045,390 | 8/1977 | Itoh et al. | 260/46.5 UA |
| 4,077,943 | 3/1978 | Sato et al. | 260/46.5 UA |

*Primary Examiner*—Morton Foelak
*Attorney, Agent, or Firm*—E. Philip Koltos; John L. Young; Philip L. Schlamp

[57] ABSTRACT

A silicone foam composition comprising a vinyl-containing polysiloxane, optionally a filler, water, a hydrogen-containing polysiloxane and a platinum catalyst. Such a silicone foam composition is useful as flame insulative material and especially for electrical systems in nuclear plants.

23 Claims, No Drawings

SILICONE FOAM COMPOSITION WHICH HAS BURN RESISTANT PROPERTIES

BACKGROUND OF THE INVENTION

The present invention relates to a silicone foam composition and more particularly the present invention relates to SiH-olefin platinum catalyzed silicone foam composition in which the novel foaming ingredient is water.

Accordingly, in the construction of many plants and buildings there are many steps taken to insulate electrical systems and more specifically sensitive electrical systems, such that in the case of fire that they will not burn easily and that if they do burn they will not propagate a fire very easily.

Accordingly, silicones with their high temperature properties are highly desirable as insulative materials for such electrical systems. For instance, silicones may tend to char and leave a protective ash on the system that they are insulating and still protect the electrical system and maintain its electrical integrity. Accordingly, such burn resistant properties of silicones have made them highly desirable as insulative materials for electrical systems and more specifically for cables. Thus, one use of heat vulcanizable silicone rubber compositions comprising a diorganopolysiloxane gum, silica filler, flame retardant additives such as platinum or carbon black and with or without a peroxide catalyst has been to fill the voids in electrical cables thus protecting the cable in case of fire.

Accordingly, in such uses it has been found that such heat vulcanizable silicone rubber compositions either in the cured or in the uncured state with a base composition disclosed above alone or with the addition of other flame retardant additives have protected the electrical integrity of the cables up to temperatures of 2000° F. for an appreciable period of time.

Accordingly, it was highly desirable to utilize such burn resistant silicone compositions as insulative materials for electrical systems and specifically electrical systems in nuclear plants. Concrete can be used to enclose and protect such elecrical systems. However, the cost of applying the concrete to irregular openings in walls and ceilings becomes quite expensive.

Accordingly, it became desirable to utilize for the insulative protection of such electrical systems silicone foams. As a matter of fact, flame retardant silicone foams are highly desirable not only for the enclosure and protection of electrical systems but also for the protection of other types of components from burning to some extent.

An example of such a flame retardant silicone foam is that, for instance, to be found in Modic, U.S. Pat. No. 3,425,967. This patent discloses a silicone foam composition which is produced by mixing and interracting a vinyl chain-stopped polysiloxane, an organopolysiloxane copolymer which was a resin composed of monofunctional units and tetrafunctional units and optionally difunctional siloxy units and inorganic fibrous material selected from the class consisting of asbestos and fibrous potassium titanate, optionally a finely divided inorganic filler, a platinum catalyst and an organo hydrogen polysiloxane and finally a blowing agent.

The examples that are given of such blowing agents are, for example, azo-isobutyronitrile, dinitrospentemethylene tetramine, benzenesulfonhydrazide N,N'-dinitroso-N,N'-dimethylterephthalamide, p,p'-oxy-bis(-benzenesulfonhydrazide), terephthalazide, azodicarbonamide, etc. Such a system while adequate for many aspects had two main disadvantages. It required the use of a complex blowing agent which increased the cost of the system and also was foamed at elevated temperatures; that is, in order to activate the blowing agent elevated temperatures were needed and accordingly a foam could not be formed in situ in an electrical system already in place at room temperature since external heating had to be applied.

A more recent attempt to produce an acceptable silicone foam for the insulation of electrical systems from fire is to be found in the disclosure of Smith, U.S. Pat. No. 3,923,705. This patent reviews some of the prior art with respect to silicone foams. The disadvantages with such a system was that it required the reaction of a silanol containing polysiloxane with hydrogencontaining polysiloxane. There was found that with such a system good foams were not always produced unless an extremely active platinum complex catalyst was utilized. The reason for this is that if an extremely active platinum complex catalyst was not utilized then the hydrogen polysiloxane reacted with hydroxy-containing polysiloxane at a slow rate, releasing hydrogen at a slow rate and as a result a foam with a proper density was not always obtained. Accordingly, the type of foam and the amount of foam would vary from reaction to reaction and from batch to batch of the composition.

Accordingly, it was highly desirable to find a silicone foam which was not expensive and which would produce a reproducable foam from batch to batch that could be produced with most types of platinum catalysts.

In addition, in the construction of many buildings and partitions in buildings where concrete or masonry products were not utilized to produce the partition, it has been common to leave such partitions hollow or not containing any material in them.

Accordingly, it has been common especially in office buildings to leave such ceilings and more particularly partitions hollow. It was early suggested that silicone compositions could be utilized both as heat insulative materials and more particularly and more importantly as burn resistant materials in such partitions and ceilings.

Accordingly, it is highly desirable to have a silicone foam which is inexpensive and can be foamed at room temperature to a good quality foam from batch to batch with most types of platinum catalysts. Such silicone foam can also be used as a burn resistant material in partitions in the construction of partitions in buildings and as an insulative material in the ceilings of buildings.

Accordingly, it is one object of the present invention to provide for an SiH-olefin platinum catalyzed silicone foam.

It is another object of the present invention to provide for an SiH-olefin platinum catalyzed silicone foam which can be catalyzed with most types of platinum catalysts to produce good quality foam which is reproducable from batch to batch.

It is yet an additional object of the present invention to provide for a process for producing an SiH-olefin platinum catalyzed silicon foam of good quality which is resistant to burning.

It is yet an additional object of the present invention to provide for a process for insulating electrical systems by utilizing an SiH-olefin platinum catalyzed silicone foam composition. These and other objects of the present invention are accomplished by means of the disclosure set forth hereinbelow.

SUMMARY OF THE INVENTION

In accordance with the above objects there is provided by the present invention a silicone foam composition useful as a burn resistant material comprising (a) 100 parts by weight of a base vinyl-containing polymer of the formula;

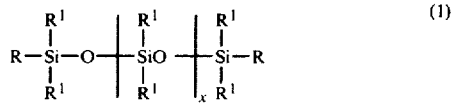

where R and $R^1$ are selected from the class consisting of alkyl radicals of 1 to 8 carbon atoms, aryl radicals, vinyl radicals and fluoroalkyl radicals of 3 to 8 carbon atoms, such that the polymer contains from 0.0002 to 3% by weight vinyl, and x varies such that the viscosity of the polymer varies from 100 to 1,000,000 centipoise at 25° C.; (b) from 0 to 200 parts by weight of a filler; (c) from 100 parts per million to 1.5 parts by weight of water; (d) from 1 to 50 parts by weight of a hydride polymer of the formula;

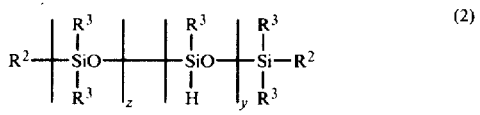

where $R^2$ is selected from the class consisting of hydrogen, alkyl radicals of 1 to 8 carbon atoms and aryl radicals, and fluoroalkyl radicals of 3 to 8 carbon atoms, and $R^3$ is selected from alkyl and aryl radicals of up to 8 carbon atoms where the hydride polymer has a hydrogen content varying from 0.3 to 1.6% by weight and z and y vary such that the polymer has a viscosity varying from 5 to 100 centipoise at 25° C., where there is at least 0.2 moles of SiH per mole of water; and (e) from 1 to 250 parts per million of a platinum catalyst. It should be noted that most types of platinum catalyst can be used in the instant process and more specifically one of the platinum complexes such as the platinum olefin complex. The most preferred catalyst is a platinum complex of platinum and a vinyl-containing polysiloxane. Most preferably such a platinum complex is substantially free of chlorine content. Such a catalyst is desired since it is extremely efficient and causes the vinyl-containing base polysiloxane polymer to react with the hydride-containing polysiloxane at a very fast rate to release hydrogen and form a good foam in the instant process. However, as stated previously, the other platinum complexes will provide and produce suitable foams within the scope of the instant invention. As such, the instant invention is not limited to the most preferred platinum complex catalyst.

It is preferred that the base vinyl-containing polymer only contain vinyl terminal units, however, it can contain some vinyl on chain units also. Also, there can be utilized as the vinyl containing base polymer, a polymer in which there is only vinyl on chain. However, such a polymer is a less preferred polymer in the composition in the process of the instant case. A filler may also be utilized in the instant process. It does improve the flame retardance of the composition. In addition, other flame retardant additives such as carbon black can be utilized in the composition to increase and enhance the burn resistant properties of the compositions of the instant case. With respect to the hydride polymer, such hydride polymer must have a hydrogen atom on the polymer chain to produce a suitable foam. However, it may also have hydride on the terminal silicone atoms, that is, the polymer may have hydrogen terminal units. However, a hydride polymer cannot be used as a cross-linking agent with only hydrogen terminal units and no hydrogen on the polymer chain. Next, it is necessary in the compositions and processes of the instant case that there be at least 0.2 moles of hydrogen in the hydride-containing polysiloxane cross-linking agent, for every mole of water to release sufficient hydrogen to produce a suitable foam.

Finally, the composition is utilized to produce a foam by simply mixing the ingredients and allowing them to react a form a foam. Upon mixture of the ingredients, the ingredients will immediately react with each other to liberate hydrogen and form the appropriate silicone foam which cures to a silicone elastomeric foam. However, the instant process can be carried out at room temperature without the need of heating. If heat is applied, of course, the reaction will proceed at a very fast rate. Accordingly, the silicone foams of the instant invention may be formed in situ in buildings at room temperature where the ingredients are simply mixed together and poured into the partition container or crevice which is desired to be filled with a silicone foam and the resulting mixture will foam and cure to a silicone elastomeric foam within the period of time of initial cure varying from 10 seconds to final cure which can take place in a period of time varying anywhere from minutes to hours.

If it is desirable in such a composition, there optionally may be included a mild inhibitor such as vinyl-containing cyclicpolysiloxane. Such an inhibitor will give the mixture sufficient pot life to be applied to the enclosure in which it is desired that the silicone foam be produced and then the system will then cure at room temperature at a slower rate than if the inhibitor was not present. If heat is applied, it can be appreciated that the system will form a silicone foam much faster. This is especially true if the inhibitor is present in the mixture. It can also be appreciated that the compositions of the instant case can be placed in enclosures or molds and allow the foam to form a shape block of silicone elastomeric foam. The use of the process of forming the silicone foams of the instant case can be varied as suits the worker skilled in the art.

DESCRIPTION OF THE PREFERRED EMBODIMENT

The basic vinyl-containing polymer has Formula (1) shown previously. In such formula, R and R' may be selected from the hydrocarbon and halogenated hydrocarbon radical with a proviso that there is present from 0.0002 to 3% by weight of vinyl substitution in the polymer, which vinyl substitution must be present such that the viscosity of the polymer varies from 100 to 1,000,000 centipoise at 25° C.

Accordingly, such hydrocarbon groups and halogenated hydrocarbon groups may be selected from alkyl radicals, methyl, ethyl, propyl, etc.; cycloalkyl radicals such as, cyclohexyl, cycloheptyl, cyclooctyl, etc.; mononuclear aryl radicals such as, phenyl, methylphenyl, ethylphenyl, etc.; alkenyl radicals such as, vinyl, allyl, etc. and more preferably, vinyl and other well known substituent groups for diorganopolysiloxane polymers. Preferably, the R and R' radicals are selected from the class consisting of alkyl radicals of 1 to 8 carbon atoms, aryl radicals such as, phenyl; vinyl radicals and halogenated hydrocarbon radicals such as, fluoroalkyl radicals of 3 to 8 carbon atoms, such as, for instance, 3,3,3-trifluoropropyl. Most preferably, the R and R' radicals are selected from methyl radicals, phenyl radicals, vinyl radicals and 3,3,3-trifluoropropl radicals where the polymer has the foregoing vinyl substitution. The preferred viscosity range of the polymer is, of course, a little more limited in that the preferred viscosity ranges from 2500 to 250,000 centipoise at 25° C., with a preferred vinyl concentration being from 0.0002 to 0.1% by weight of vinyl concentration of the polymer. Although a polymer having the broad range of vinyl concentration will operate in the present invention, the more limited vinyl concentration would allow for a reaction in which the reaction proceeds at the appropriate rate that is not too slow and yet sufficiently in accordance with the description of the invention and allows the proper cross-linking in the polymer to produce the cured silicone elastomeric foam. With respect to the preferred range of the viscosity, as can be appreciated, it is preferred that the viscosity of the vinyl mixed composition prior to forming the silicone foam be not too high otherwise the composition is difficult to handle and to pour. Accordingly, the lower viscosities are preferred for the vinyl-containing polymer in preparing the composition of the instant case. Accordingly, in accordance with the above description it is preferred that the viscosity of the base vinyl containing polymer vary anywhere from 1000 to 250,000 centipoise or more preferably 2500 to 100,000 centipoise at 25° C. If the viscosity of the base vinyl-containing polymer is kept low then the viscosity of the total composition will also be lower than would be the case with a higher vicosity base vinyl-containing polymer and as such the composition will have a total mixture viscosity that is lower and thus the composition will be easier to handle and pour into the openings in which it is desired to have a silicone foam formed. The preferred formula for the base vinyl-containing polymer is as follows;

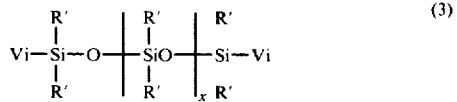

(3)

where R' is selected from the class consisting of methyl, phenyl and 3,3,3-trifluoropropyl and mixtures thereof. In the most preferred form of the base vinyl-containing polymer of the instant case, it is preferred that there be only vinyl groups in the siloxy terminal units as disclosed in Formula (3) above. However, it is possible to use a polymer in which there is only vinyl units in the siloxy units in the polymer chain. Thus, there can be produced a silicone foam in which the vinyl units appear only on the siloxane chain and in which there are no vinyl terminating units in the polymer. However, such a base vinyl-containing polymer does not result in a foam with as good physical properties as does the silicone foam produced with a vinyl-containing polymer containing vinyl terminal siloxy units.

In another and more preferred embodiment of the instant case, there can be utilized as the base vinyl-containing polymer, a polymer wherein the vinyl units are both on the terminal positions of the polymer chain as well as on the siloxy units in the polymer chain. While such a polymer will produce an appropriate silicone elastomeric foam such a foam is not as desirable and does not have as good physical properties as when the vinyl terminated base polymer of Formula (3) is utilized above, which is the most preferred polymer for utilization in the process of the instant case. Such vinyl-containing polymers are well known in the art and can be produced by methods well known in the art.

With respect to the non-fluorinated polymers, such vinyl-containing polymers can be produced by hydrolyzing the appropriate diorganodichlorosilanes in water, then cracking the hydrolyzate with an alkali metal hydroxide, preferably KOH, at elevated temperatures to preferentially distill overhead cyclictetrasiloxanes or cyclictrisiloxanes in case of the fluorinated polymers and then taking the cyclictetrasiloxanes and equilibrating them at elevated temperatures, that is, temperatures above 150° C., in the presence of small quantities of potassium hydroxide and also in the presence of the appropriate chain-stoppers. For instance, to produce the polymer of Formula (3) there would be needed to be utilized divinyltetraorganodisiloxane chain-stoppers such as, for instance, divinyltetramethyldisiloxane, chain stopper in the appropriate amounts.

The resulting mixture is heated at temperatures above 150° C. and allowed to equilibrate until approximately 85% by weight of the cyclictetrasiloxanes have been converted to the linear polymer of the desired viscosity. At that point the mixture is cooled, the alkali metal hydroxide is neutralized with an appropriate mild acid such as, phosphoric acid, and unreacted cyclics are vented off to leave behind the desired vinyl-containing polymer. The appropriate vinyl-containing polymers can be obtained not only for Formula (3), but also with vinyl in the polymer chain by equilibrating the appropriate vinyl-containing cyclictetrasiloxanes. More details are to be found in the production of such vinyl-containing polymers in the foregoing Modic, U.S. Pat. No. 3,425,967, which is hereby incorporated in the present case by reference.

The second preferred but not really necessary ingredient in the compositions of the instant case is from 0 to 200 parts by weight by a filler, which may be either an extending or reinforcing filler. It should be noted that extending fillers are preferred since reinforcing fillers such as fumed silica and precipitated silica when incorporated into the composition in any concentration unduly increase the viscosity of the composition, thus, making it difficult to handle and to pour. However, fumed silica and precipitated silica have the advantages of increasing the physical properties, that is, the Tensile Strength, as well as the Tear of the silicone elastomeric foam that is formed from the composition.

Accordingly, in the more preferred embodiment of the instant case there is utilized from 10 to 100 parts of filler based on 100 parts of the vinyl-containing base polymer.

It should be noted that all the concentration of ingredients set forth in the instant case are based per 100 parts of the base vinyl-containing polymer. Accordingly, there may be utilized in the preferred embodiment anywhere from 10 to 100 parts of a filler selected from the class consisting of reinforcing fillers and extending fillers and, more preferably, just extending fillers. A preferred extending filler that may be utilized in the instant composition which does not unduly increase the viscosity of the uncured composition is ground quartz. Ground quartz has the additional advantage that to some extent it increases the burn resistance properties of the cured silicone foam that is produced from the composition. Other extending fillers that may be utilized in the instant compositions are, for instance, titanium dioxide, lithopone, zinc oxide, zirconium silicate, silica aerogel, iron oxide, diatomaceous earth, calcium carbonate, glass fibers, magnesium oxide, chromic oxide, zirconium oxide, aluminum oxide, alpha quartz, calcined clay, carbon, graphite, etc.

It should be noted if reinforcing fillers are used such as, fumed silica and precipitated silica, that in order to keep the viscosity increase in the composition as low as possible, such filler even the extending fillers may be treated, for instance, with cyclicpolysiloxanes or silazanes. The disclosure in which silica fillers may be treated, for instance, with cyclicpolysiloxanes is set forth in U.S. Pat. No. 2,938,009, Lucas, which is hereby incorporated by reference. However, such is only one method of treating reinforcing fillers and other methods with other agents are also available in the art.

Another method of treating reinforcing fillers is, for instance, to be found in Brown, U.S. Pat. No. 3,024,126, disclosure of which is hereby incorporated by reference; Smith, U.S. Pat. No. 3,635,743 and Beers, U.S. Pat. No. 3,837,878. Such ingredients such as, cyclicpolysiloxanes, may also be utilized to treat extending fillers such as, ground quartz, with some advantage since such treatment does also alleviate the viscosity increase caused by extending fillers. However, as stated previously, the most preferred filler for utilization to produce silicone foam of the instant case, is ground quartz. Quartz enhances the burn resistant properties of the composition as well as imparting some enhanced physical properties to the final cured silicone foam. Based on the 100 parts of vinyl-containing polymer, there is then preferably utilized as a third ingredient in the composition of the instant case from 100 parts per million to 1.5 parts by weight of water. If less than 100 parts per million of water is utilized, then there will not be produced sufficient hydrogen to properly foam the composition. It can be appreciated in the composition of the instant case, water is the blowing agent. The advantages of the utilization of water is that it is non-toxic, and participates with the actual cure of the silicone foam that is formed from the basic SiH-olefin platinum catalyzed composition and the only vapors that are given off are hydrogen and works with a variety of platinum complexes. In the more preferred embodiment of the instant case there is used from 500 to 15,000 parts per million of the total composition of water. This is the appropriate amount of water as a blowing agent to properly foam the composition without liberating too much hydrogen or without liberating too little hydrogen to produce an appropriate foam. Accordingly, there should be utilized from 0.2:1 to 50:1 moles of SiH per mole of water. The preferred range of moles of SiH to water is from 1 mole of SiH to 1 mole of water to 5 moles of SiH to 1 mole of water. Within the preferred range, the preferred amount of hydrogen is liberated to produce the desired silicone foam without liberating too much hydrogen and yet liberating enough hydrogen to produce the desired low density silicone foam. It should be noted that the lower the density of the silicone foam the more desirable this is since less silicone material is utilized to produce the foam and accordingly, the less expensive the foam becomes. The only caveat to be observed in such production of low density foam is that it is undesirable to have large cavities in the foam where insufficient silicone material is present in the foam, such that the foam does not have sufficient physical strength. It also can be appreciated that the other hydride polymers in excess of that necessary to react with the water will add on to the vinyl groups of the base vinyl-containing polymer to cross-link the vinyl-containing polymer and form the silicone foam in the presence of a platinum catalyst. The advantages of water as a blowing agent is that it costs nothing and releases no noxious fumes. The fourth ingredient that is necessary in the composition of the instant case is that there must be present from 1 to 50 parts by weight of the hydride polysiloxane of Formula (2) above, where $R^2$ is selected from the class consisting of hydrogen, alkyl radicals of 1 to 8 carbon atoms, aryl radicals and fluoroalkyl radicals of 3 to 8 carbon atoms, and $R^3$ is selected from alkyl radicals, aryl radicals of up to 8 carbon atoms, where the hydride polymer has the hydrogen content varying from 0.3 to 1.6% by weight and z and y varies such that the polymer has a viscosity varying from 5 to 100 centipoise at 25° C. The concentration of moles of water to hydride polymer has been discussed above, which concentration limits must be met in order to produce a foam that is desirable.

It should be noted that the other limitation above is that the hydrogen content of the hydride polysiloxane polymer varies from 0.3 to 1.6% by weight. Of necessity, this limitation must be met, otherwise, the hydride polymer will not have enough hydrogen molecules to react with water to liberate the hydrogen and also react and cross-link with the vinyl molecules of the vinyl-containing polysiloxane to form the cured silicone foam. If there is not enough hydride in the polymer, that is, the 0.3% lower limitation by weight, then there will not be sufficient hydrogen in the polymer to cross-link with the vinyl-containing polymer.

Accordingly, the hydrogen content of such polymer must be observed strictly as the amount of moles of water per mole of hydrogen polysiloxane cross-linking agent. It should be noted also that the viscosity is quite important and that y varies such that the viscosity of the polymer varies from 5 to 100 centipoise and more preferably from 5 to 40 centipoise. It should be noted that hydride containing polysiloxanes of a higher viscosity and molecular weight may be utilized, however, such polymers are difficult to obtain and difficult to utilize with the appropriate hydride content for use in the instant invention. The reason for the above is that for the reaction of the instant invention to proceed in accordance with the disclosure, it is necessary that the hydride polymer of Formula (3) contain hydrogen on the siloxane chain. Although it may contain hydrogen atoms on a terminal siloxy atom, it must contain hydride atoms on the polymer chain in order for the reaction of the instant case to operate. If there are no hydrogen atoms in the polymer chain of the hydride polymer, then a proper silicone foam is not obtained. Accordingly, a hydride polymer of the instant case with only hydrogen atoms on the terminal siloxy atoms will not work to form a silicone foam in the composition of the instant case.

In accordance with the above and as limited above, $R^2$ may be selected from the class consisting of hydrogen and any hydrocarbon radical and halogenated hydrocarbon radical normally associated with polysiloxane polymers, preferably, other than aliphatic unsaturated radicals. Accordingly, the $R^2$ radical may preferably be selected from any alkyl radicals such as, methyl, ethyl, propyl; cycloalkyl radicals such as, cyclohexyl, cycloheptyl, etc.; mononuclear aryl radicals such as, phenyl, methylphenyl, ethylphenyl, etc.; halogenated hydrocarbon radicals such as, fluoroalkyl radicals, 3,3,3-trifluoropropyl, etc. Most preferably, the $R^2$ radical is selected from the class consisting of hydrogen, alkyl radicals of 1 to 8 carbon atoms, aryl radicals of 6 to 8 carbon atoms and fluoroalkyl radicals of 3 to 8 carbon atoms, and most preferably $R^2$ is selected from methyl, phenyl and 3,3,3-trifluoropropyl radicals. The $R^3$ radical is selected from alkyl and aryl radicals of up to 8 carbon atoms. It is desirable that the vinyl-containing polymer not contain any hydrogen substituent groups and in the hydrogen polysiloxane polymer of Formula (2) there be no vinyl or aliphatic unsaturated substituent groups. It should be noted there is preferably used from 1 to 50 parts by weight of hydride polysiloxane cross-linking agent of Formula (2), per 100 parts of base vinyl-containing polymer of Formula (1) above. The production of the hydrogen substituted polysiloxane polymer which is non-fluorinated is much simpler than the foregoing production of the vinyl-containing polymer. Such low viscosity hydride substituted polysiloxane polymers are basically obtained by hydrolyzing the appropriate hydride substituted dichlorosilanes with diorganodichlorosilanes with the appropriate amount of chain-stoppers, whether they be hydride substituted or not.

Both in the production of vinyl-containing polymers of Formula (1), as well as in the production of the hydride polymer, the appropriate substituted chain-stopper may be any disiloxane, trisiloxane or low molecular weight linear polymer. With respect to the hydrolysis reaction in the production of the hydride polysiloxane polymer then there is utilized as chain-stoppers a monofunctional silane having the appropriate substituent groups such as, hydrogen dimethylchlorosilane, trimethylchlorosilane, 3,3,3-trifluoropropyldimethylchlorosilane. Accordingly, such chain-stoppers which are chlorosilanes having the appropriate substituent groups may be utilized to form the low viscosity and low molecular weight hydride polysiloxane polymer cross-linking agent of Formula (2).

It is also possible to make such low molecular weight polymers by equilibrating the appropriate cyclictetrasiloxanes with a very mild acid catalyst such as, acid activated clay, such as the foregoing Filtrol with the appropriate chain-stoppers.

It should also be noted that in such equilibration procedures which are carried out at elevated temperatures with an acid catalyst they are preferably carried out at temperatures above 90° C., and more preferably above 100° C. to equilibrate the cyclictetrasiloxanes and form and convert about 85% of the cyclictetrasiloxanes to the linear polymer whereupon the acid catalyst is removed by filtration and the cyclics are vented off to give the desired linear polymer.

With fluorinated polymers a slightly different procedure is utilized to produce such fluorinated polymers. In the case of the vinyl-containing base polymer of Formula (1), the appropriate fluorinated cyclictetrasiloxanes are equilibrated with chain-stoppers in the presence of certain basic catalysts such as, cesium hydroxide, potassium silanolate, at temperatures about 90° C., or slightly above to produce at anywhere from 50 to an 60% conversion of the linear polymer at viscosities at least up to 1,000,000 centipoise at 25° C., wherein the catalyst is then neutralized with a mild acid and the cyclics are vented off to give the fluorinated polymer. The fluorinated cyclictetrasiloxanes are obtained by hydrolyzing the appropriate fluorinated dichlorosilane and then cracking the hydrolyzate with KOH and obtaining as much of the pure tetrasiloxanes as possible. However, another preferred method of producing such fluorinated polymers, that is, a vinyl-containing polysiloxane polymer of Formula (1), which is fluorinate substituted, is to crack the hydrolyzate with KOH and preferentially distill overhead the fluorinated cyclictrisiloxanes which are produced in greater quantities than the fluorinated cyclictetrasiloxanes by careful fractionation. The fluorinated cyclictetrasiloxanes when equilibrated with an alkali metal hydroxide catalyst are converted to the high viscosity or low viscosity fluorinated substituted polymer. Such cyclictrisiloxanes can be also equilibrated in the presence of a mild basic catalyst to form fluoro-substituted linear fluids, that is, materials having viscosities in the area of 1000 to 10,000 centipoise of viscosity at 25° C. or less. A fuller disclosure as to the production of such fluorine substituted polymers used in SiH-olefin addition reactions is to be found in Jeram, U.S. Pat. No. 4,041,010, which is incorporated herein by reference. For the purpose of the instant case, if it is desired to obtain a fluorine-substituted hydride polysiloxane polymer within the scope of Formula (2), it can be obtained by direct hydrolysis of of the appropriate fluoro-substituted chlorosilanes. Finally, in the process of the instant case there is utilized generally from 1 to 250 parts per million of a platinum catalyst and more preferably 1 to 200 parts per million of a platinum catalyst. It is more preferred to utilize a stabilized platinum complex in the process of the instant case since it disperses in the ingredients much more easily and as such results in faster reaction time.

Many types of platinum compounds for this SiH-olefin addition reaction are known and such platinum catalysts may be used also for the reaction of the present case. The preferred platinum catalysts especially when optical clarity is required are those platinum compound catalysts which are soluble in the present reaction mixture. The platinum compound can be selected from those having the formula $(PtCl_2.Olefin)_2$ and $H(PtCl_3.Olefin)$ as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride cyclopropane complex $(PtCl_2.C_3H_6)_2$ described in U.S. Pat. No. 3,159,662, Ashby. Still, further, the patent containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

All the patents and patent applications mentioned in this present specification are incorporated into the present application by reference.

The preferred platinum compound to be used not only as a platinum catalyst but also as a flame retardant additive is that disclosed in U.S. Pat. No. 3,775,452, Karstedt. Generally speaking, this type of platinum complex is formed by reacting chloroplatinic acid containing 4 moles of water of hydration with tetramethyltetravinylcyclosiloxane in the presence of sodium bicarbonate in an ethanol solution.

It can be appreciated that, as stated previously, many types of platinum catalysts can be utilized in the process of the instant case to produce a silicone foam since the compositions of the instant case are not as sensitive to a particular type of platinum catalyst as was the case with the prior art compositions. However, a preferred platinum catalyst within the scope of the instant case is either the Lamoreaux catalyst disclosed in the foregoing patent set forth above or the Karstedt platinum catalyst set forth in the disclosure hereinabove.

The Karstedt platinum catalyst which is the one preferred catalyst within the scope of the instant case, comprises reacting chloroplatinic acid with a vinyl-containing cyclotetrasiloxane or a vinyl-containing low molecular weight polysiloxane in the presence of an alcohol and a mild base such as, sodium bicarbonate, such that the platinum complex is substantially chlorine free. Such a catalyst, because of its reactivity, can be used with advantage in the compositions of the instant case. The advantage of the platinum catalyst, such as the Karstedt platinum complex catalyst within the scope of the instant case, is that it is so reactive that the foam is formed at a good rate and hydrogen gases liberated at a good rate so that the desired low density is formed in a faster manner than is the case when other types of platinum catalyst are used.

It should also be noted that platinum complexes formed between chloroplatinic acid and a vinyl-containing siloxane material can also be used as a catalyst in the process in compositions of the instant case, irrespective of whether they are chlorine free. However, a platinum complex catalyst which is obtained by reacting a vinyl-containing siloxane with a chloroplatinic acid and in which the chlorine content is substantially reduced is a catalyst with different properties and is more advantageously utilized in the production of the silicone foams of the instant case.

Finally, the low density silicone foams of the composition of the instant case are to some extent burn resistant. To enhance the burn resistance of the silicone foams of the instant case, other burn resistant additives may be added to the composition to obtain such property. For instance, per hundred parts of the base vinyl containing polymer of Formula (1), there may be added anywhere from 0.1 to 10 parts of carbon black and more preferably, a carbon black that is low in residual sulfur. Such carbon blacks which are low in residual sulfur produce the best flame resistant properties when added to such composition. More preferably, there may be utilized anywhere from 0.5 to 2 parts of a low residual content carbon black per 100 parts of the base vinyl-containing polymer. It is noted that the additional amount of carbon black above 2 parts does add burn resistant properties but not to such a great extent. Accordingly, the preferred range of carbon black utilized in the compositions of the instant case, so as to impart advantageous burn resistant properties to the composition, is from 0.5 to 2 parts of carbon black. Although 0.2 parts of low residual sulfur carbon black will impart some burn resistant properties to the composition, it is desirable that it be utilized at a concentration of 0.5 parts to obtain the more desirable burn resistant properties.

It can also be appreciated that the burn resistant properties of the silicone foam of the instant composition may be further improved by adding to the composition other well known burn resistant additives so long as they do not interfere with the basic reactions of producing silicone foams of the instant case and as long as they do not inhibit or poison the platinum catalyst or the SiH-olefin platinum catalyzed reaction to form the silicone elastomer of the composition of the instant case.

Finally, the compositions of the instant case are produced by incorporating carbon black and the filler, if any, into the vinyl-containing polymer and then mixing the platinum catalyst either with a vinyl-containing polymer or with a hydride polysiloxane cross-linking agent along with the platinum catalyst.

The platinum catalyst is incorporated, preferably, in the vinyl-containing polymer. The water may be added to the vinyl-containing polymer or it may be incorporated in the hydride polysiloxane. Again, however, preferably the water is incorporated into the vinyl-containing polymer since there is more of the vinyl-containing base polymer and as such can be more easily incorporated into the composition. It can also be appreciated that water may be added to the composition just prior to when the reaction is carried out. However, the hydride polymer without a platinum catalyst is advantageously packaged separately from the vinyl-containing base polymer such that there are two components. When the party or purchaser desires to form the silicone foam, the hydride polysiloxane is rapidly mixed into the vinyl-containing polymer containing the platinum catalyst and the water or the water may be added at the time of mixing and the composition is poured into the desired cavity and allowed to form a silicone foam. The composition will then cure and liberate hydrogen and the vinyl-containing base polymer will react with the hydrogen polysiloxane in the presence of the platinum catalyst to cure to form a silicone foam. Although such a process is advantageous for many purposes, it is sometimes desired to have a certain amount of work life or pot life in the mixed composition prior to its cure. Accordingly, for such purposes, it is normal to use an inhibitor. It has been found that to the compositions of the instant case there is desirably used at least 200 parts per million based on the total composition of an inhibitor which is a vinyl-containing cyclictetrasiloxane such as, tetramethyltetravinylcyclopolysiloxane. When added to the composition on this compound gives the composition some work life or pot life. More preferably, such a vinyl-containing cyclictetrasiloxane is added to the composition at a concentration of anywhere from 100 parts per million to 10,000 parts per million based on the total composition so as to give to the composition a work life varying anywhere from 5 to 20 minutes at room temperature. Smaller amounts of such an inhibitor does not give an appreciable increase of work life at room temperature of the composition and larger amounts of the inhibitor may be used than 10,000 parts per million, per weight of the composition. However, such has not been found to be necessary.

It has been found that the foregoing concentrations of the vinyl-containing cyclictetrasiloxanes will impart the desired amount of work life to the compositions of the instant case for most applications. As stated previously, the composition of the instant case may be used without the presence of a weak inhibitor. Upon the mixing of the two components, the composition will start to cure immediately with the liberation of hydrogen to produce a silicone foam. As stated previously, the inhibitor may be present in either component, it only being necessary with respect to preparing the silicone foam to add the amount of water that is appropriate if the water has not been added already, to mix the two components thoroughly, and then to apply the composition into the appropriate cavity or mold and allow the composition to foam to a silicone foam. The only caution that has to be maintained in preparing the two components or packages is that the hydrogen-containing polysiloxane cross-linking agent is to be packaged in a component separate from the platinum catalyst base polymer component, and where the component with which the other ingredients are packaged into will be determined by the particular two component system that is desired to be prepared. It should also be noted that x, y in Formulas (1), (2) and (3) above are whole numbers that vary such that the polymers of Formulas (1), (2) and 3 have the desired general and specific viscosities disclosed previously, that is, x of Formulas (1) and (3) will vary such that the base vinyl-containing polymer has generally a viscosity that varies from 100 to 1,000,000 centipoise at 25° C., or more preferably, varies from 2500 to 10,000 centipoise at 25° C., and y in Formula (2) of the hydride polysiloxane cross-linking agent disclosed above will vary such that generally the polymer may have a viscosity varying anywhere from 5 to 100 centipoise at 25° C., but more preferably varying from 5 to 50 centipoise at 25° C., and more specifically varying from 5 to 40 centipoise at 25° C.

The examples below are given for the purpose of illustrating the practice of the above invention. They are not given for any purpose of setting limitations and defining the scope of the invention as set forth in the specification and claims. All parts are by weight.

EXAMPLE 1

To 20 parts of a vinyl-terminated dimethylpolysiloxane polymer of 3500 centipoise at 25° C., and having a 0.0014% by weight vinyl content. There was added two drops of water (0.05 parts) and two drops of tetramethyltetravinylcyclictetrasiloxane. To this mixture there was added 20 parts per million platinum in the form of the Karstedt platinum complex set forth previously. To this composition there was added two parts of a black masterbatch containing 1 part of carbon black with low residual sulfur. To cure and foam this basic mixture there was added to 100 parts of the above mixture, 10 parts of a hydrogen polysiloxane of 20 viscosity at 25° C. having a 1.5% by weight of hydrogen content and having the following formula;

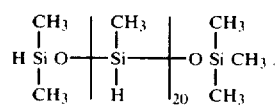

After mixing for approximately 30 seconds, the catalyzed mixture began to foam and started to gel. The expansion of the foam was complete within two minutes and cured completely after one hour. When the cured foam was exposed to a Bunsen burner flame, it would glow but would not sustain combustion after the flame was removed. It should be noted that with the composition and process of the instant case as soon as the two components have been mixed and as soon as the effect of any inhibitor that is present has dissipated, the hydrogen polysiloxane reacts with the vinyl-containing polysiloxane to cure the silicone foam that is formed. After the initial reaction proceeds to form the silicone elastomeric foam which in the case if no inhibitor is present is immediately, the final cured silicone elastomeric foam is obtained in the period of time varying anywhere from 1 hour to 12 hours for final cure.

EXAMPLE 2

There was formed a Composition A by taking a 3500 centipoise at 25° C. vinyl dimethyl end-stopped polydimethylsiloxane to which was added 30 parts per million of platinum in the form of the Karstedt catalyst. The following ingredients were added to Composition A, shown in the following table, in the amounts indicated in the Table 1 where the amounts were parts by weight:

Composition B: water
Composition C: methylvinylcyclotetrasiloxane
Composition D: trimethyl end-stopped polymethyl hydrogen siloxane having 1.5% silicon bonded hydrogen

TABLE 1

| Composition | A | B | C | D |
|---|---|---|---|---|
| 1 | 30 | 0.03 | 0.04 | 0.5 |
| 2 | 30 | 0.03 | 0.04 | 1.0 |
| 3 | 60 | 0.03 | 0.04 | 1.0 |
| 4 | 90 | 0.03 | 0.04 | 1.0 |
| 5 | 120 | 0.03 | 0.04 | 1.0 |

All the compositions in the above table produced foams within minutes.

EXAMPLE 3

To a 70,000 centipoise at 25° vinyl dimethyl end-stopped polydimethylsiloxane was added 25 parts per million of platinum or the Karstedt catayst. To 100 parts of this 70,000 centipoise vinyl polymer was added 0.05 parts of water and 0.04 parts of methyl vinyl cyclics. Then 5 parts of Composition D of Example 2 was added to above, and immediately hydrogen gas was evolved. The mixture began to foam and produced a very fine celled foam. This foam had a much finer cell size than the foams made using the lower viscosity vinyl polymer of 3500 centipoise at 25° C.

EXAMPLE 4

A mixture was prepared by blending 10.5 parts of 380 centipoise at 25° C., vinyl dimethylpolysiloxane, 9.4 parts of 10 micron alpha quartz, 0.1 parts of carbon black and a platinum catayst as defined by the Lamoreaux patent in an amount sufficient to give 30 parts per million platinum. To this mixture there was added one drop (0.028 parts) of water and 0.03 parts of methylvinyl cyclotetrasiloxane. Then 1 part of Composition D of Example 2 was added and after mixing for forty-five seconds a foam began to form. The resulting foam had a specific gravity of 0.4 and was fire retardant. It had a Limiting Oxygen Index of 33.0.

I claim:

1. A silicone foam composition useful as a burn resistant material comprising (a) 100 parts by weight of a base vinyl-containing polymer of the formula,

where R and R' are selected from the class consisting of alkyl radicals of 1 to 8 carbon atoms, aryl radicals, vinyl radicals and fluoroalkyl radicals of 3 to 8 carbon atoms, such that the polymer contains from 0.0002 to 3% by weight vinyl and x varies such that the vicosity of the polymer varies from 100 to 1,000,000 centipoise at 25° C.; (b) from 0 to 200 parts by weight of a filler; (c) from 100 to 15,000 parts per million by weight of water; (d) from 1 to 50 parts by weight of a hydride polymer of the formula,

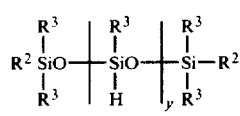

where $R^2$ is selected from the class consisting of hydrogen, alkyl radicals of 1 to 8 carbon atoms and aryl radicals, and fluoroalkyl radicals of 3 to 8 carbon atoms, and $R^3$ is selected from the class consisting of alkyl radicals and aryl radicals of up to 8 carbon atoms, where the hydride polymer has a hydrogen content varying from 0.3 to 1.6% by weight and y varies such that the polymer has a viscosity varying from 5 to 100 centipoise at 25° C., where also there is at least 0.2 moles of the SiH per mole of water, and (e) from 1 to 250 parts per million of a platinum catalyst.

2. The composition of claim 1 wherein the base vinyl-containing polymer has the formula,

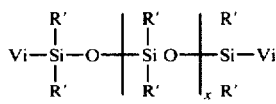

wherein R' is selected from the class consisting of methyl, phenyl and 3,3,3-trifluoropropyl.

3. The composition of claim 1 wherein there is present from 10 to 100 parts of a filler selected from the class consisting of reinforcing fillers and extending fillers.

4. The composition of claim 3 wherein the filler is ground quartz.

5. The composition of claim 1 wherein there is present from 0.2 to 1 to 50 to 1 moles of SiH per mole of water.

6. The composition of claim 1 wherein there is present from 500 to 15,000 parts per million of water.

7. The composition of claim 1 wherein there is present from 0.1 to 10 parts of carbon black.

8. The composition of claim 1 wherein there is present from 100 to 10,000 parts per million of an inhibitor which is a vinyl-containing organocyclotetrasiloxane.

9. The composition of claim 1 wherein the hydride polymer has the formula;

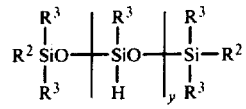

where $R^2$ and $R^3$ are selected from the class consisting of methyl, phenyl, and 3,3,3-trifluoropropyl and mixtures thereof.

10. The composition of claim 1 wherein the platinum catalyst is a complex of platinum and a vinyl-containing polysiloxane which is substantially free of chlorine.

11. A process for producing a silicone foam having burn resistant properties comprising (1) mixing (a) 100 parts by weight of a base vinyl-containing polymer of the formula,

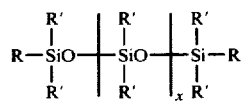

where R and R' are selected from the class consisting of alkyl radicals of 1 to 8 carbon atoms, aryl radicals, vinyl radicals and fluoroalkyl radicals of 3 to 8 carbon atoms such that the polymer contains from 0.0002 to 3% by weight and x varies such that the viscosity of the polymer varies from 100 to 1,000,000 centipoise at 25° C.; (b) from 0 to 200 parts by weight of a filler; (c) from 100 to 15,000 parts per million of water; (d) from 1 to 50 parts by weight of a hydride polymer of the formula,

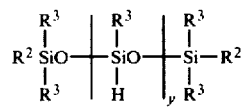

where $R^2$ is selected from the class consisting of hydrogen, alkyl radicals of 1 to 8 carbon atoms, aryl radicals and fluoroalkyl radicals of 3 to 8 carbon atoms and $R^3$ is selected from alkyl and aryl radicals of up to 8 carbon atoms, where the hydride polymer has a hydrogen content varying from 0.3 to 1.6% by weight and y varies such that the polymer has a viscosity varying from 5 to 100 centipoise at 25° C., where also such that there is at least 0.2 moles of the SiH per mole of water; and (e) from 1 to 250 parts per million of platinum catalyst, and (2) allowing the mixture to foam and cure to an elastomeric foam.

12. The process of claim 11 wherein the base vinyl-containing polymer has the formula,

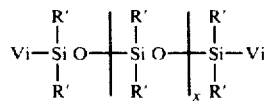

wherein R' is selected from the class consisting of methyl, phenyl and 3,3,3-trifluoropropyl.

13. The process of claim 11 wherein there is present from 10 to 100 parts of a filler selected from the class consisting of reinforcing fillers and extending fillers.

14. The process of claim 13 wherein the filler is ground quartz.

15. The process of claim 11 wherein there is present from 0.02 to 1 to 50 to 1 moles of the SiH per mole of water.

16. The process of claim 11 wherein there is present from 500 to 15,000 parts per million of water.

17. The process of claim 11 wherein there is present from 0.1 to 10 parts of carbon black.

18. The process of claim 11 wherein there is present from 100 to 10,000 parts per million of an inhibitor which is a vinyl-containing organocyclotetrasiloxane.

19. The process of claim 11 wherein the hydride polymer has the formula,

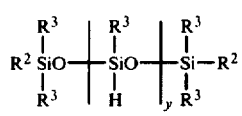

where $R^2$, $R^3$ are selected from the class consisting of methyl, phenyl, 3,3,3-trifluoropropyl and mixtures thereof.

20. The process of claim 11 wherein the platinum catalyst is a complex of platinum and a vinyl-containing polysiloxane which is substantially free of chlorine.

21. The process of claim 11 wherein step (2) is carried out at room temperature.

22. A process for insulating from fire an electrical system by enclosing said electrical system in a burn resistant silicone foam comprising (1) mixing (a) 100 parts by weight of a base vinyl-containing polymer of the formula;

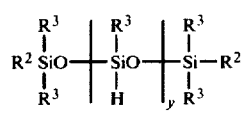

where R, R' are selected from the class consisting of alkyl radicals of 1 to 8 carbon atoms, aryl radicals, vinyl radicals and fluoroalkyl radicals of 3 to 8 carbon atoms such that the polymer contains from 0.0002 to 3% by weight vinyl and x varies such that the viscosity of the polymer varies from 100 to 1,000,000 centipoise at 25° C.; (b) from 0 to 200 parts by weight of a filler; (c) from 100 to 15,000 parts per million by weight of water; (d) from 1 to 250 parts by weight of a hydride polymer of the formula, $$R^2 \underset{R^3}{\overset{R^3}{\underset{|}{\overset{|}{Si}}}}O \left[ \underset{R^3}{\overset{R^3}{\underset{|}{\overset{|}{Si}}}}O \right] \left[ \underset{H}{\overset{R^3}{\underset{|}{\overset{|}{Si}}}}O \right]_y \underset{R^3}{\overset{R^3}{\underset{|}{\overset{|}{Si}}}}-R^2$$

where $R^2$ is selected from the class consisting of hydrogen, alkyl radicals of 1 to 8 carbon atoms, aryl radicals, and fluoroalkyl radicals of 3 to 8 carbon atoms, and $R^3$ is selected from alkyl radicals and aryl radicals of up to 8 carbon atoms, where the hydride polymer has a content varying from 0.3 to 1.6% by weight and y varies such that the polymer has a viscosity varying from 5 to 100 centipoise at 25° C., where also such that there is at least 0.2 moles of SiH per mole of water; and (e) from 1 to 250 parts per million of a platinum catalyst to form a mixture; (2) applying said mixture about said electrical system; and (3) allowing said mixture to foam to form an elastomeric silicone foam.

23. The process of claim 22 wherein said electrical system is part of a nuclear installation.

* * * * *